US012482419B2

(12) United States Patent
Lee et al.

(10) Patent No.: US 12,482,419 B2
(45) Date of Patent: Nov. 25, 2025

(54) DISPLAY PANEL AND DISPLAY DEVICE INCLUDING THE SAME

(71) Applicant: LG DISPLAY CO., LTD., Seoul (KR)

(72) Inventors: Dong Kyu Lee, Paju-si (KR); Kyu Jin Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 174 days.

(21) Appl. No.: 18/537,656

(22) Filed: Dec. 12, 2023

(65) Prior Publication Data

US 2024/0221661 A1 Jul. 4, 2024

(30) Foreign Application Priority Data

Dec. 30, 2022 (KR) ........................ 10-2022-0190039

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2310/0262* (2013.01); *G09G 2310/0286* (2013.01); *G09G 2310/0297* (2013.01); *G09G 2310/08* (2013.01); *G09G 2320/028* (2013.01); *G09G 2320/0686* (2013.01)

(58) Field of Classification Search
CPC ......... G09G 3/3233; G09G 2300/0819; G09G 2300/0842; G09G 2310/0262; G09G 2310/0286; G09G 2310/0297; G09G 2310/08; G09G 2320/028; G09G 2320/0686; G09G 3/3266; G09G 3/3208; G09G 2300/0426; G09G 2300/0809; G09G 2358/00; G09G 2380/10
See application file for complete search history.

(56) References Cited

U.S. PATENT DOCUMENTS 10,991,330 B1 * 4/2021 Li ........................ G09G 3/3674
2011/0051055 A1 * 3/2011 Lee ........................ G02F 1/1323 349/106
2011/0284881 A1 * 11/2011 Shikina ................ H10K 59/879 257/E27.121
2012/0127064 A1 * 5/2012 Kawano ............... G09G 3/3225 345/76
2015/0187404 A1 7/2015 Oh
(Continued)

FOREIGN PATENT DOCUMENTS

KR 10-2012-0074914 A 7/2012
KR 10-2190962 B1 12/2020

*Primary Examiner* — Dmitriy Bolotin
(74) *Attorney, Agent, or Firm* — Morgan, Lewis & Bockius LLP

(57) ABSTRACT

A display panel according to an embodiment and a display device including the same are disclosed. The display panel includes a plurality of pixel circuits each configured to selectively drive a first light-emitting element and a second light-emitting element, a shift register configured to output a mode control signal for driving each of the pixel circuits sharing a data line on a line basis according to a clock signal, an output circuit configured to output the mode control signal output from the shift register according to a line control signal, and a multiplexing switch unit configured to output a gate-on voltage and a gate-off voltage to the pixel circuits of a corresponding line on the basis of the mode control signal output from the output circuit.

22 Claims, 15 Drawing Sheets

(56) References Cited

U.S. PATENT DOCUMENTS

| | | | | |
|---|---|---|---|---|
| 2017/0032730 | A1* | 2/2017 | Yeon | G09G 3/3607 |
| 2020/0286448 | A1* | 9/2020 | Kim | G09G 5/18 |
| 2022/0139300 | A1* | 5/2022 | Yokoyama | H05B 33/14<br>345/214 |
| 2024/0212576 | A1* | 6/2024 | Lee | G09G 3/2007 |
| 2024/0221661 | A1* | 7/2024 | Lee | G09G 3/3266 |
| 2024/0257719 | A1* | 8/2024 | Shin | G09G 3/3233 |

* cited by examiner

【FIG. 1】
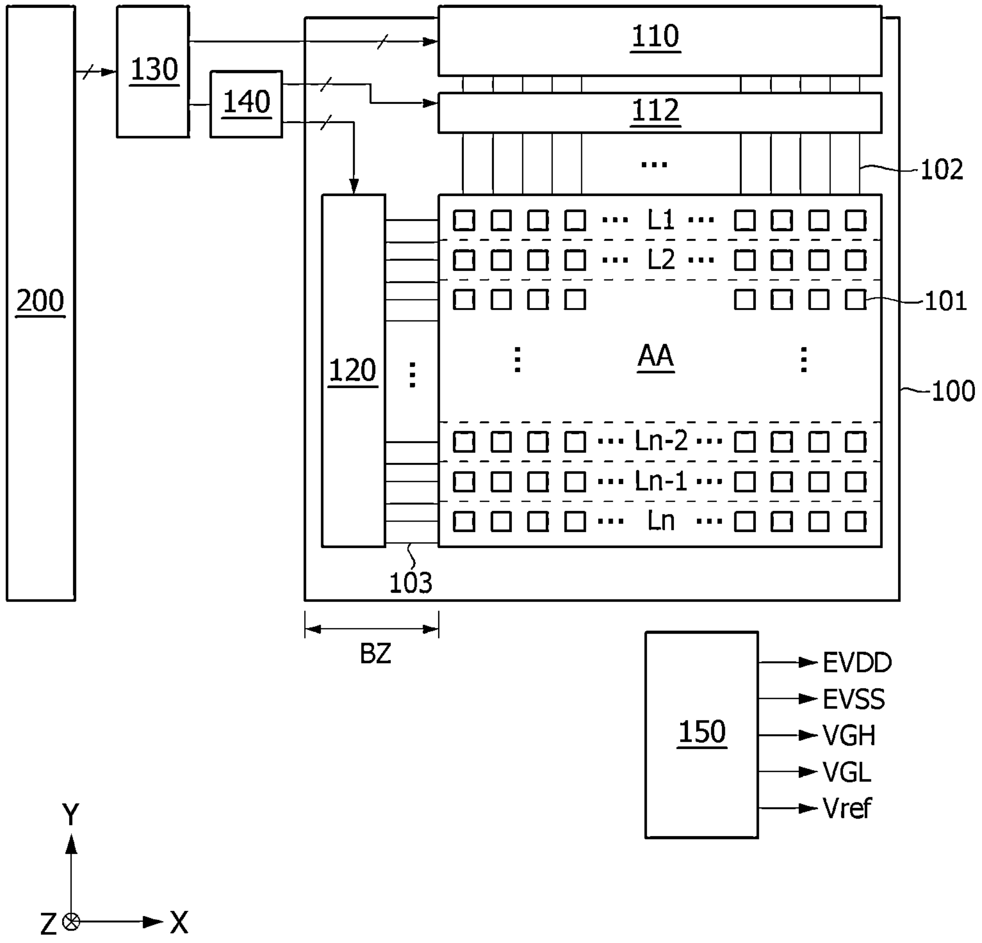

【FIG. 2】
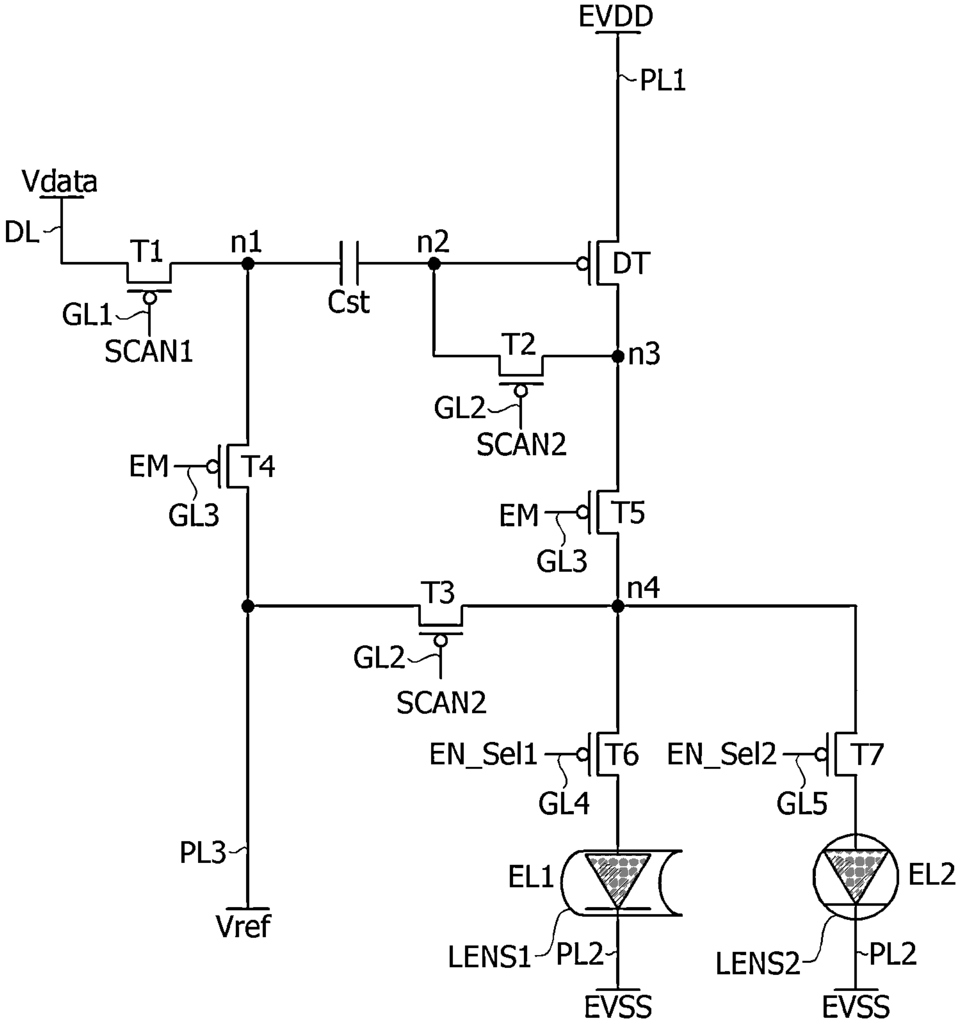

【FIG. 3】
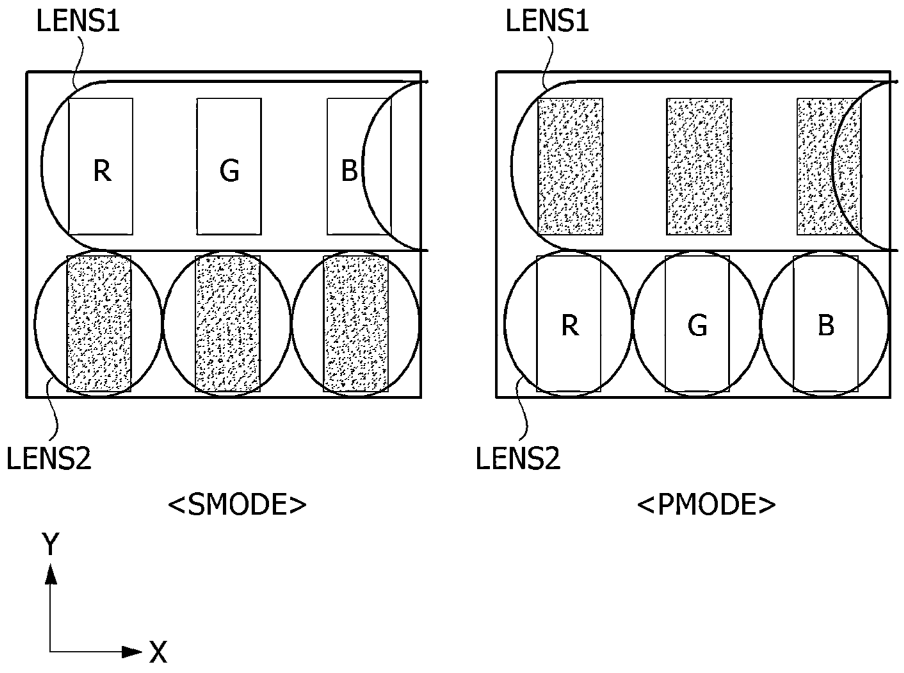

【FIG. 4】
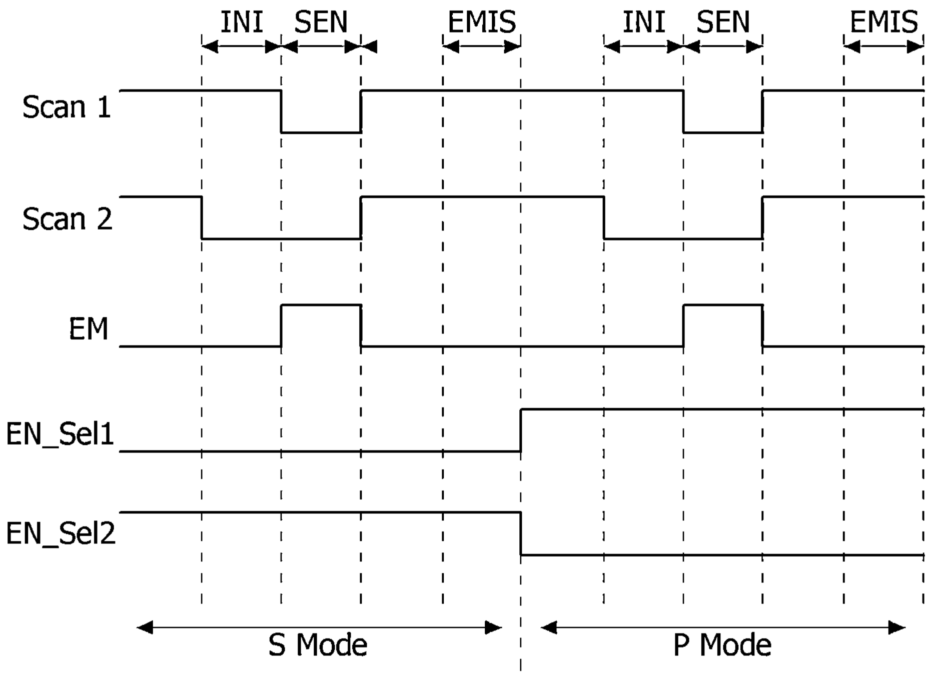

[FIG. 5]
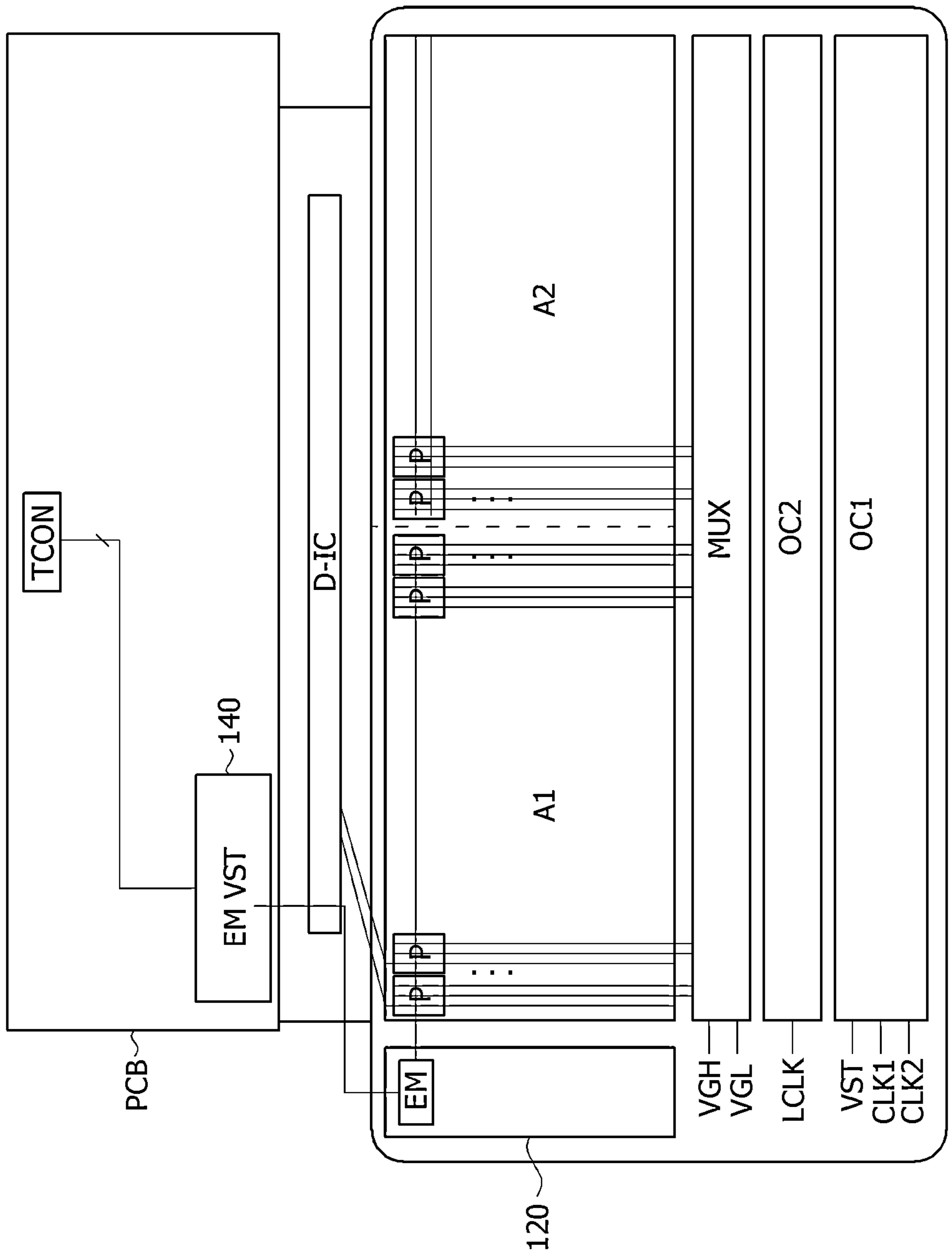

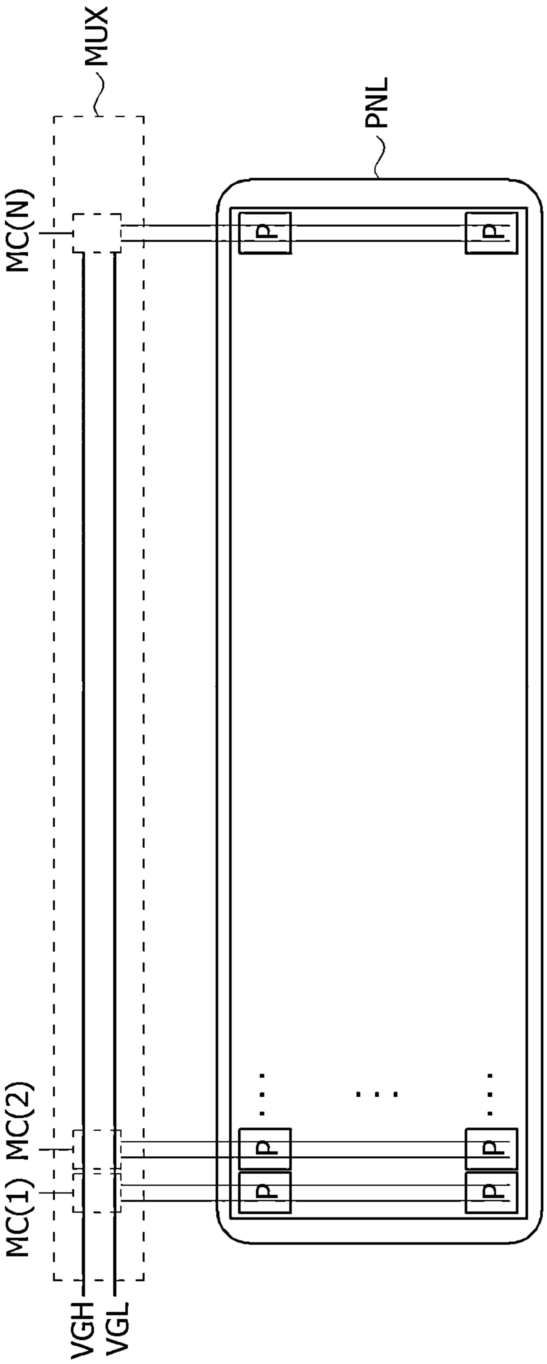
[FIG. 6]

【FIG. 7A】
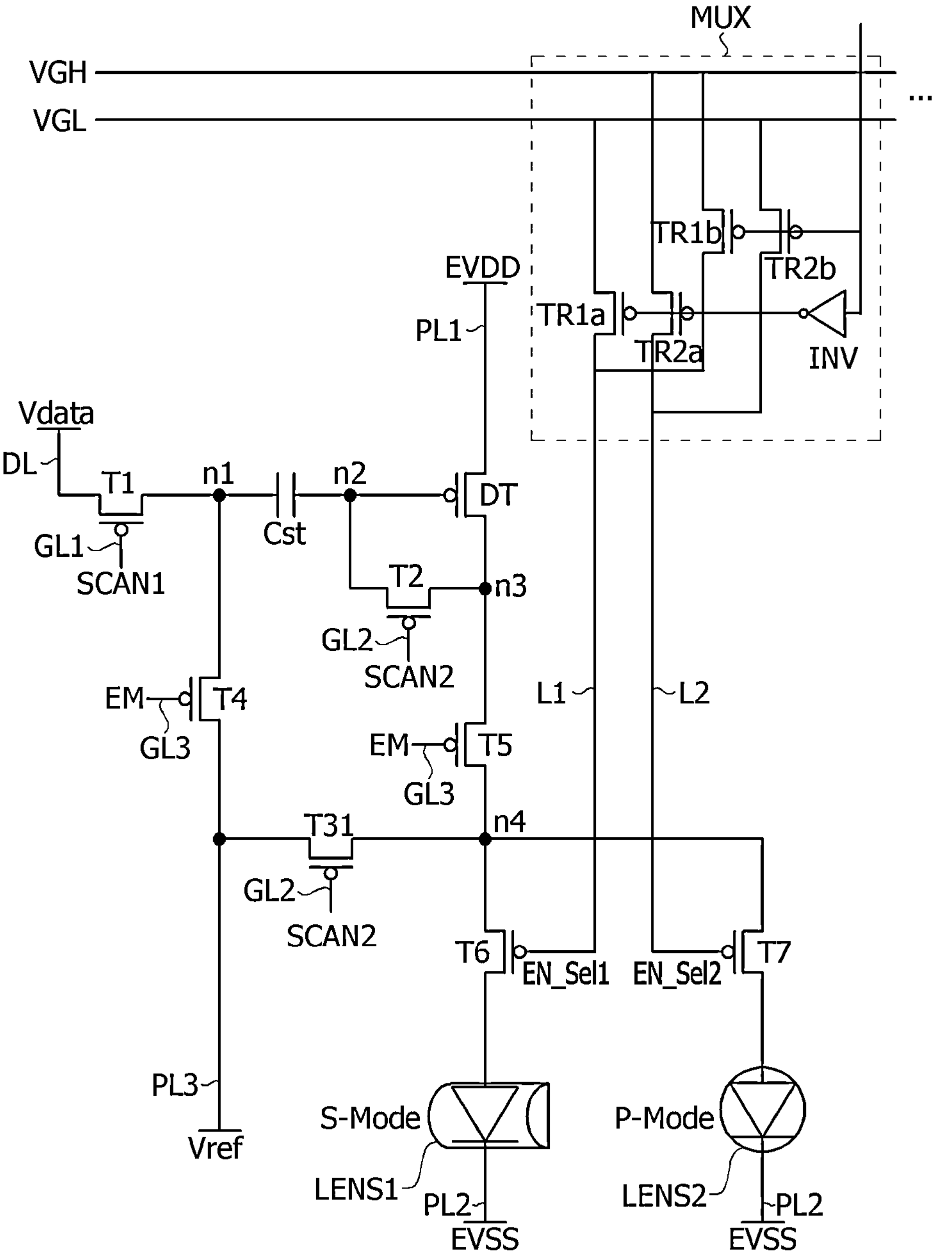

【FIG. 7B】
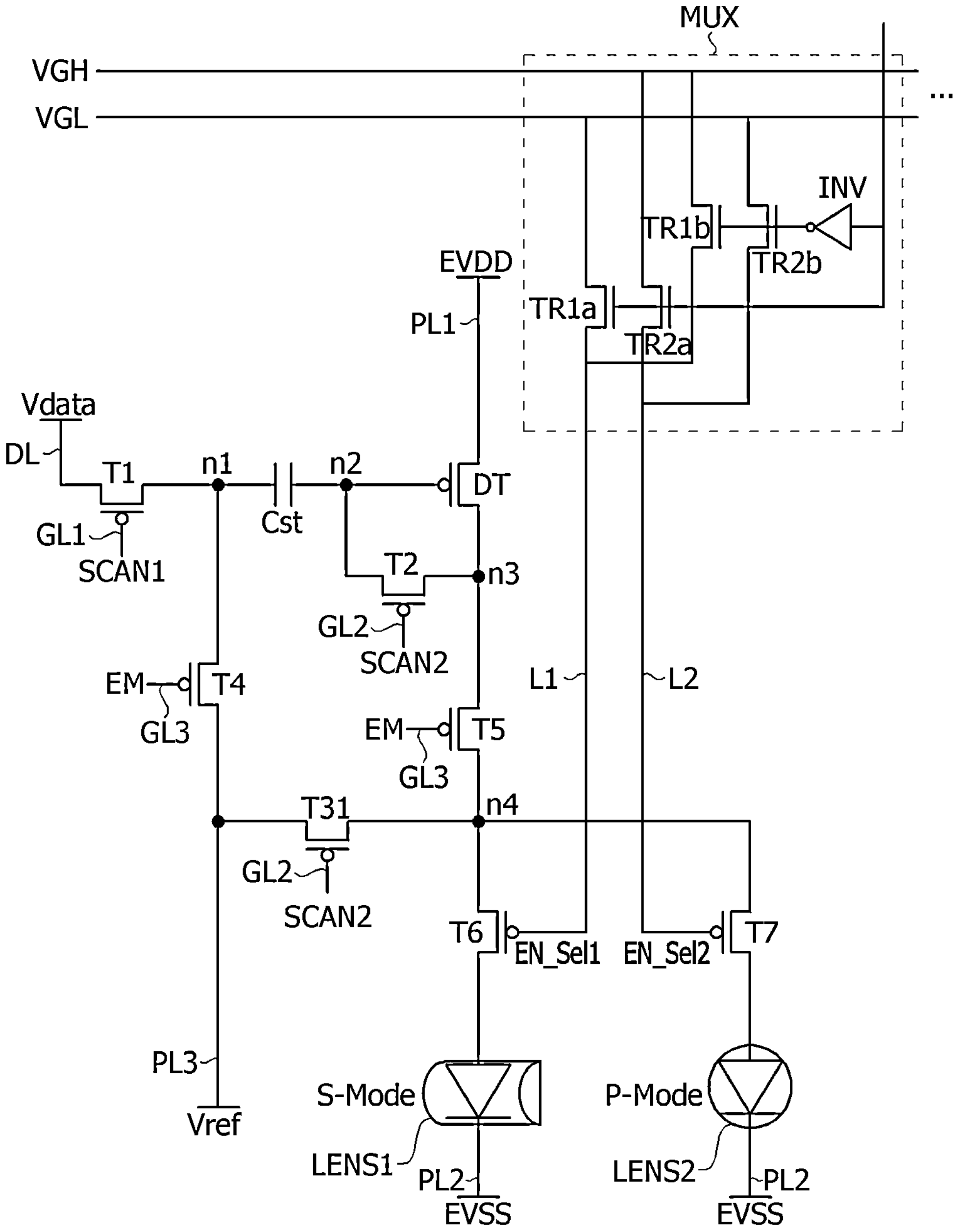

[FIG. 8]
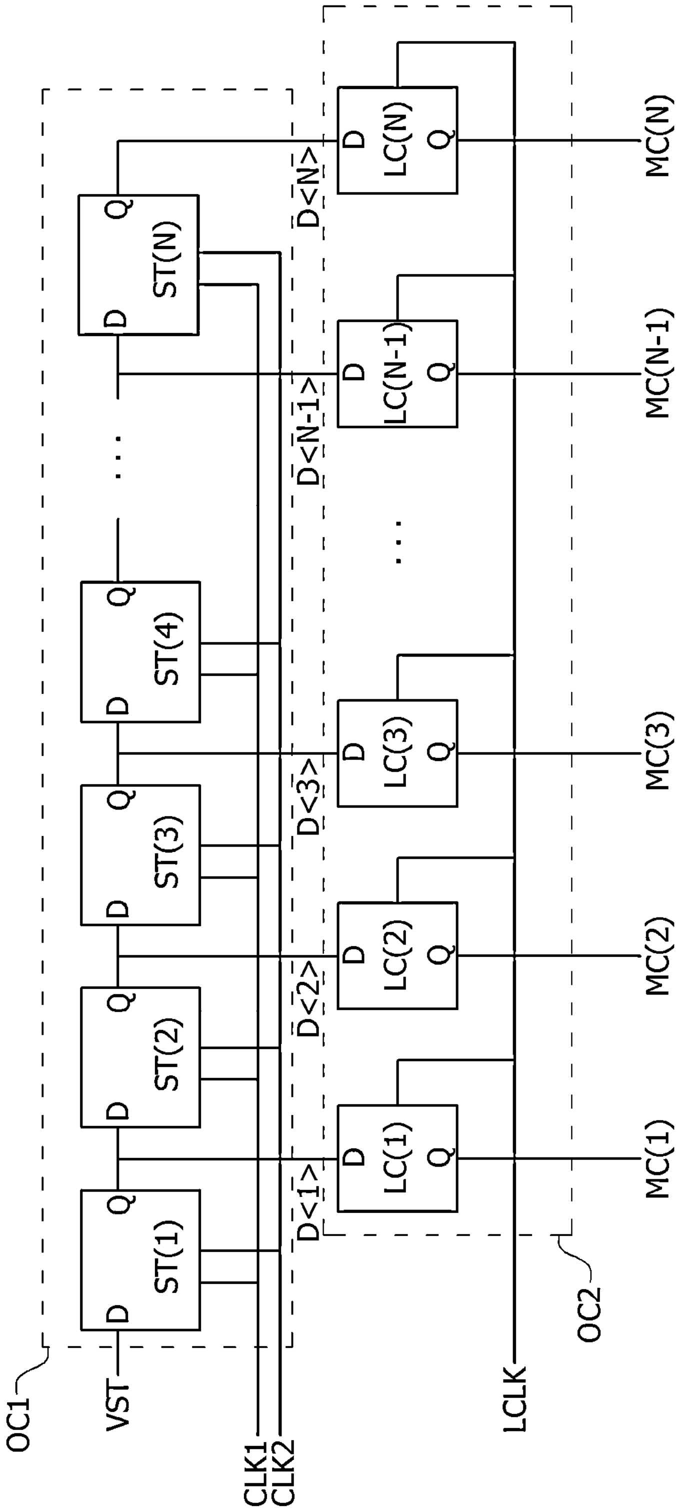

【FIG. 9】
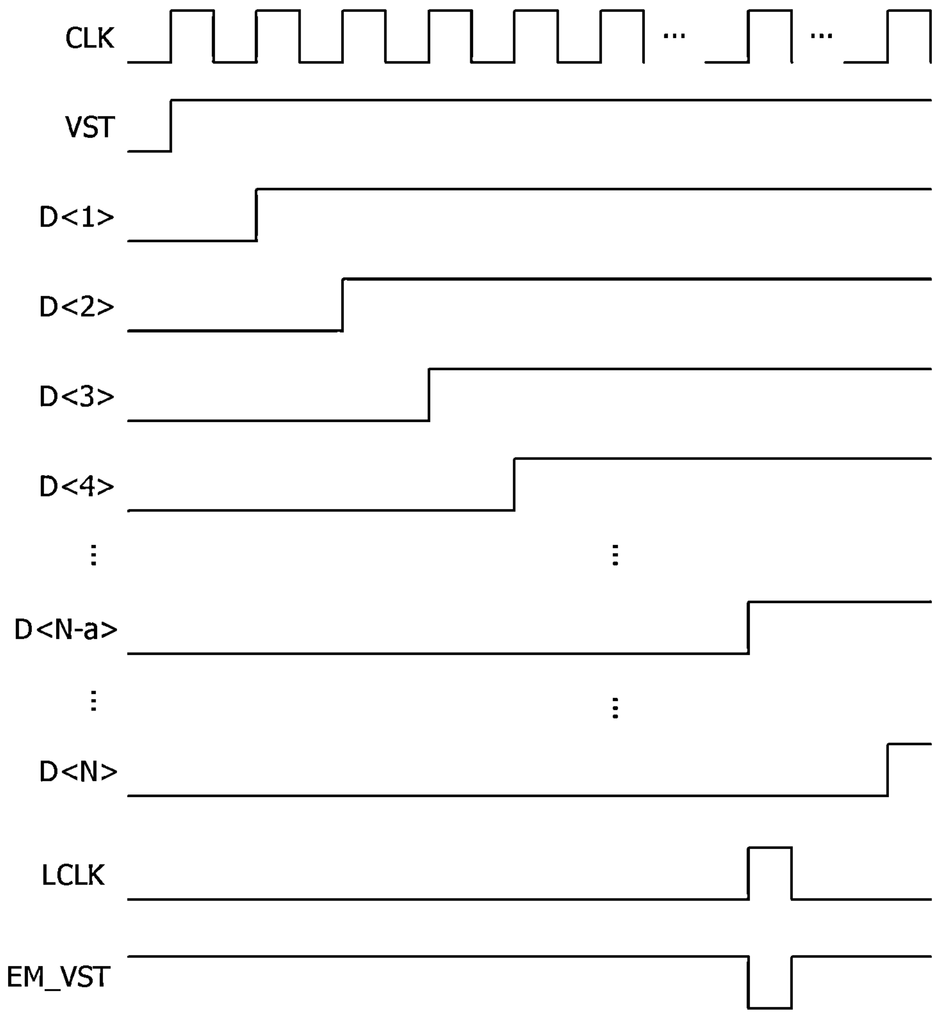

[FIG. 10]
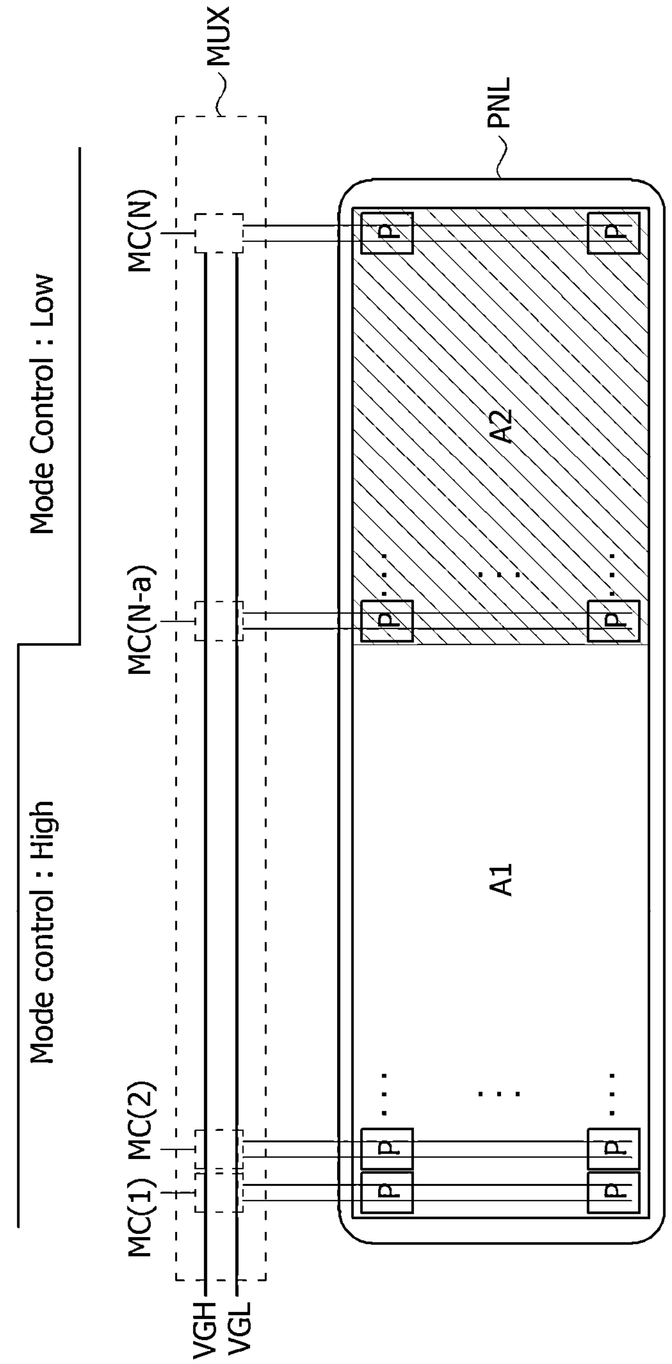

[FIG. 11]
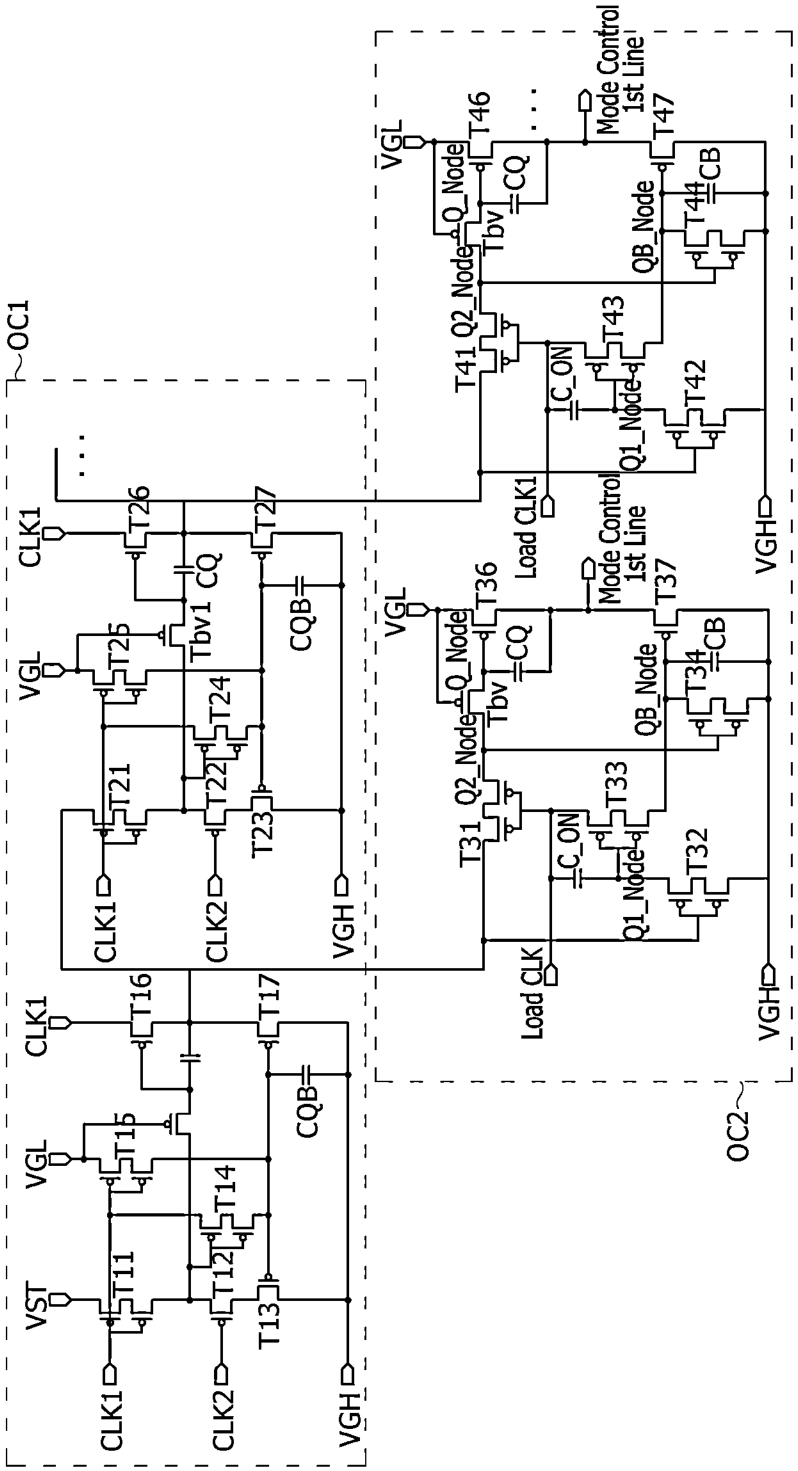

[FIG. 12]
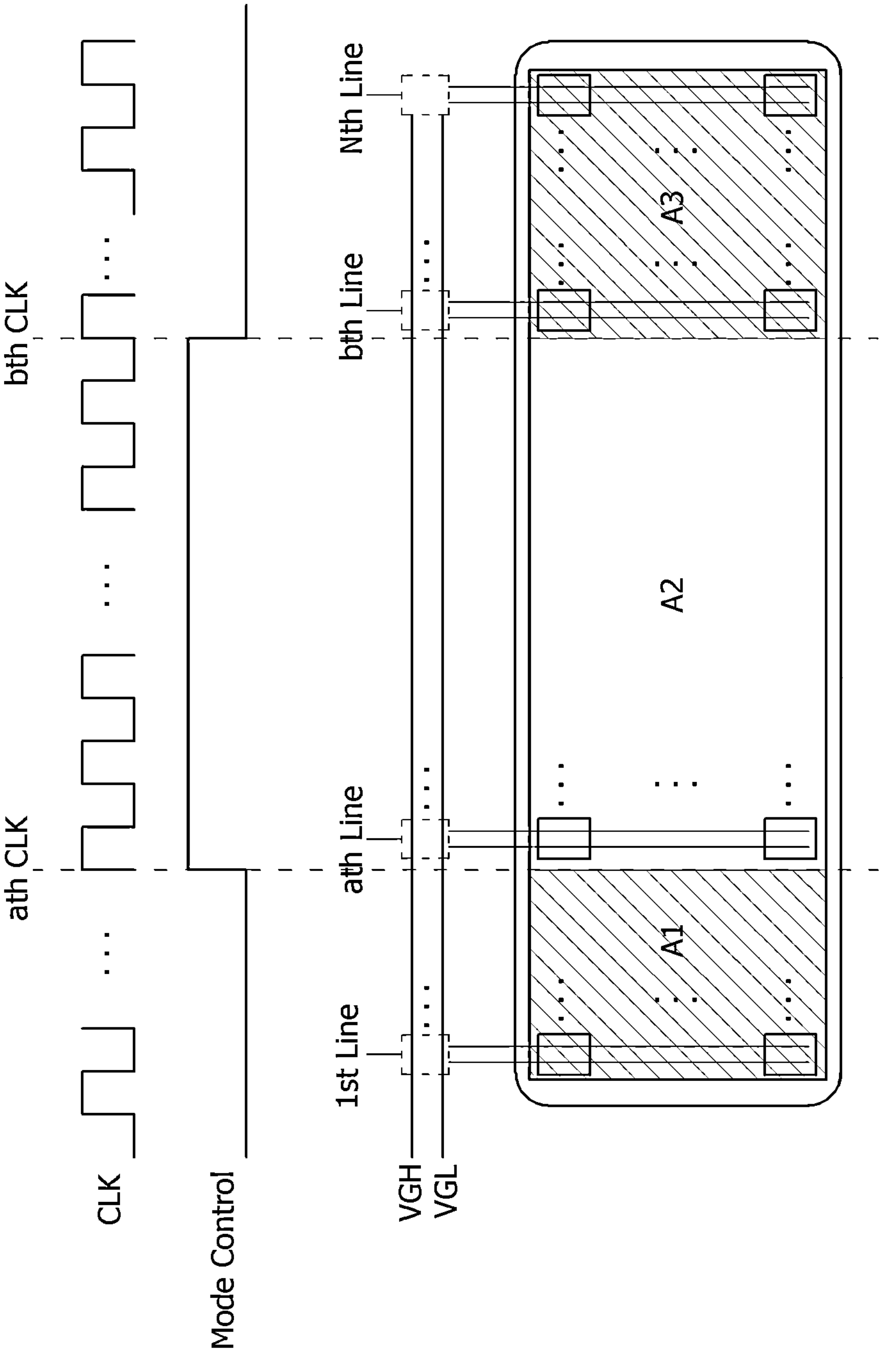

【FIG. 13】
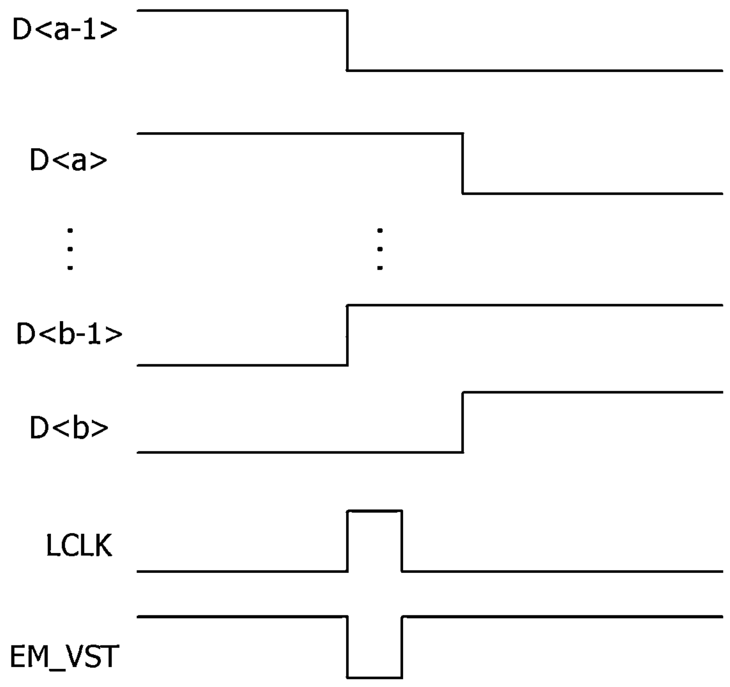

[FIG. 14]
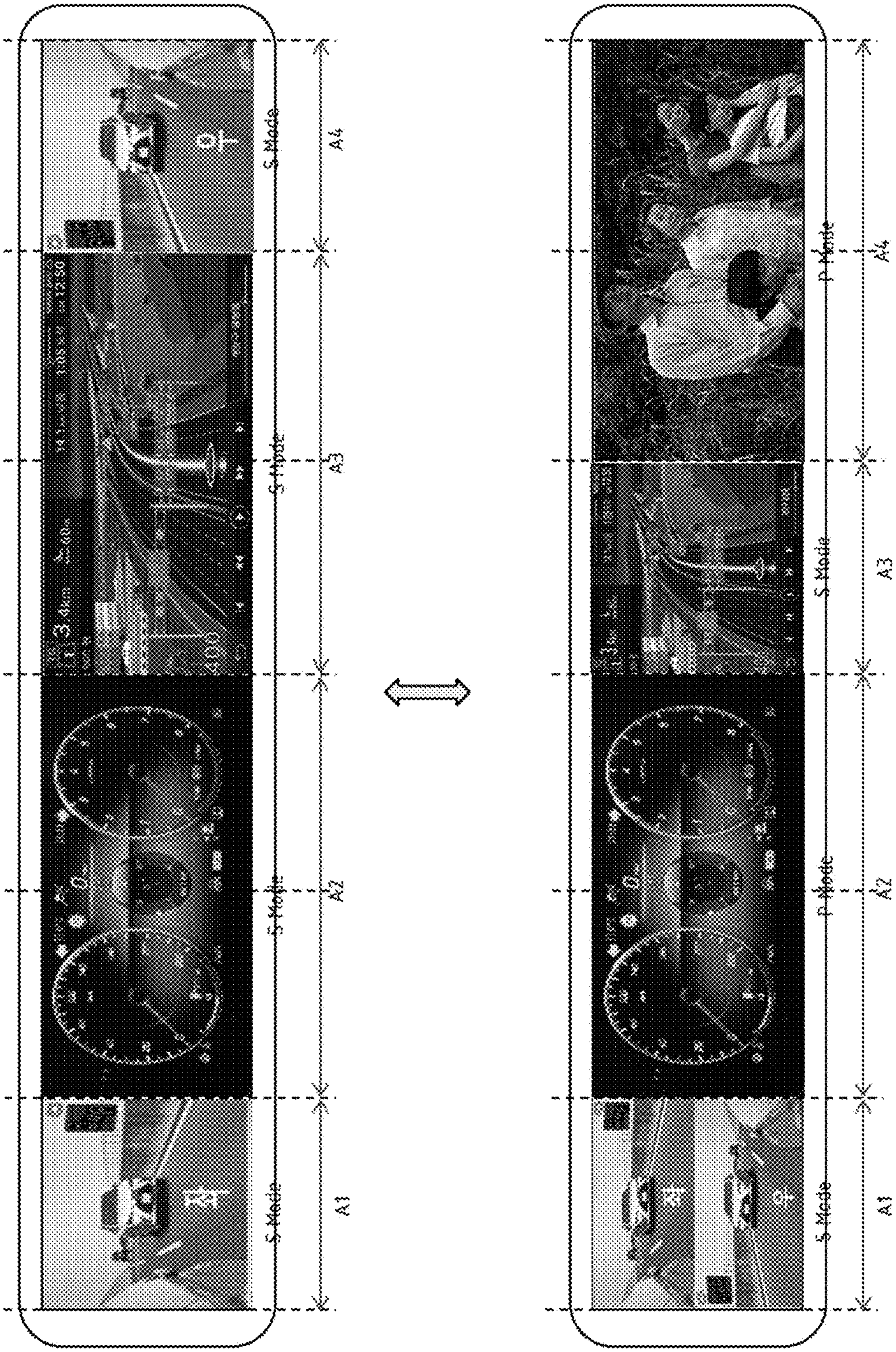

DISPLAY PANEL AND DISPLAY DEVICE INCLUDING THE SAME

CROSS-REFERENCE TO RELATED APPLICATION

This application claims the priority benefit of Korean Patent Application No. 10-2022-0190039, filed on Dec. 30, 2022, the entire contents of which are hereby expressly incorporated herein for all purposes.

BACKGROUND

1. Technical Field

The present disclosure relates to a display panel and a display device including the same, and more particularly, for example, without limitation, to a display panel comprising a plurality of pixel circuits each configured to selectively drive a first light-emitting element and a second light-emitting element, and a display device including the same.

2. Discussion of the Related Art

The market for autonomous vehicles is expanding. The autonomous vehicles are demanding changes in the market for vehicle displays that allow users to enjoy various entertainment in a vehicle. In the case of a vehicle having an autonomous driving function, a vehicle display with a large screen is provided. Various visual information such as driving information and entertainment information may be displayed together on a screen of the vehicle display.

Research is being conducted on a method of dividing the screen of the vehicle display, and controlling a part of the screen with a narrow viewing angle and the other part thereof with a wide viewing angle. This technology may allow a personal content image, which can be viewed only by a specific user, to be displayed by driving pixels having a narrow viewing angle and disposed in a partial area of the screen, and simultaneously, allow a shared content image, which can be viewed by multiple users, to be displayed by driving pixels having a wide viewing angle and disposed in the other area of the screen. However, in this technology, it difficult to adjust the viewing angle for each area of the screen as desired.

SUMMARY

Accordingly, embodiments of the present disclosure are directed to a display panel and a display device including the same that substantially obviates one or more of the problems due to limitations and disadvantages of the related art.

An aspect of the present disclosure is to provide a display panel capable of being switched between a share mode and a privacy mode on a line basis, and a display device including the same.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display panel may comprise a plurality of pixel circuits each configured to selectively drive a first light-emitting element and a second light-emitting element, a shift register configured to output a mode control signal for driving each of the pixel circuits sharing a data line on a line basis according to a clock signal, an output circuit configured to output the mode control signal output from the shift register according to a line control signal, and a multiplexing switch unit configured to output a gate-on voltage and a gate-off voltage to the pixel circuits of a corresponding line on the basis of the mode control signal output from the output circuit.

In another aspect, a display device may comprise a display panel including a plurality of pixel circuits each configured to selectively drive a first light-emitting element and a second light-emitting element, a shift register configured to output a mode control signal for driving each of the pixel circuits sharing a data line on a line basis according to a clock signal, an output circuit configured to output the mode control signal output from the shift register according to a line control signal, and a multiplexing switch unit configured to output a gate-on voltage and a gate-off voltage to the pixel circuits of a corresponding line on the basis of the mode control signal output from the output circuit, a gate driving unit configured to apply a gate signal to the plurality of pixel circuits, and a data driving unit configured to apply a data voltage to the plurality of pixel circuits.

Other details of the exemplary embodiments are included in the detailed description and the drawings.

According to the present disclosure, by selectively driving a first light-emitting element and a second light-emitting element of pixel circuits sharing a data line on a line basis using a shift register, a display area can be controlled in a share mode and a privacy mode on a line basis.

According to the present disclosure, a mode can be controlled on a line basis so that a degree of freedom in mode setting can be maximized.

According to the present disclosure, by implementing a shift register and an output circuit at a lower end portion of a display panel and adding only four signals VST, CLK1, CLK2, and LCLK, a bezel can be minimized.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings:

FIG. 1 is a block diagram illustrating a display device according to an exemplary embodiment of the present disclosure;

FIG. 2 is a circuit diagram illustrating a pixel circuit according to a first embodiment of the present disclosure;

FIG. 3 is a view illustrating lenses disposed on first and second light-emitting elements shown in FIG. 2;

FIG. 4 is a waveform diagram illustrating gate signals and mode selection signals applied to the pixel circuit shown in FIG. 2;

FIGS. 5 to 10 are diagrams for describing a mode switching principle according to an exemplary embodiment of the present disclosure:

FIG. 11 is a circuit diagram illustrating an actual implementation circuit of a shift register and an output circuit shown in FIG. 8:

FIGS. 12 and 13 are diagrams for describing a mode switching principle according to another embodiment of the present disclosure; and FIG. 14 is a view illustrating information reproduced on a screen of a display device according to an exemplary embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted or may be briefly provided t to avoid unnecessarily obscuring the subject matter of the present disclosure.

The terms such as "comprise," "include," "have," and "contain," "consist of," "constitute," "make up of," "formed of," used herein are generally intended to allow other components to be added unless the terms are used with the term such as "only." Any references to singular may include plural unless expressly stated otherwise.

Components are interpreted to include an ordinary error range or an ordinary tolerance range even if not expressly stated.

When the position relation between two components is described using the terms such as "on," "above," "over," "below," "under," "beside," "beneath," "near," "close to," "adjacent to," "on a side of," "next," or the like, one or more components may be positioned between the two components unless the terms are used with the term such as "immediately" or "directly."

Spatially relative terms, such as "under," "below," "beneath", "lower," "over," "upper" and the like, may be used herein for ease of description to describe one element or feature's relationship to another element(s) or feature(s) as illustrated in the figures. It will be understood that the spatially relative terms can encompass different orientations of an element in use or operation in addition to the orientation depicted in the figures. For example, if an element in the figures is inverted, elements described as "below" or "beneath" other elements or features would then be oriented "over" the other elements or features. Thus, the exemplary term "below" can encompass both an orientation of below and above. Similarly, the exemplary term "above" or "over" can encompass both an orientation of "above" and "below".

In describing temporal relationship, terms such as "after," "subsequent to," "following," "next," "before," and the like may include cases where any two events are not consecutive, unless the term such as "immediately" "just" or "directly" is explicitly used.

The terms "first," "second," "A," "B," "(a)," "(b)," or the like may be used to distinguish components from each other, but the functions or structures of the components are not limited by ordinal numbers or component names in front of the components. Accordingly, as used herein, a first component may be a second component within the technical idea of the present disclosure.

In addition, terms, such as first, second, A, B, (a), (b), or the like may be used herein when describing components of the present disclosure. Each of these terminologies is not used to define an essence, order, or sequence of a corresponding component but used merely to distinguish the corresponding component from other components. In the case that it is described that a certain structural element or layer is "connected", "coupled", "adhered" or "joined" to another structural element or layer, it is typically interpreted that another structural element or layer may be "connected", "coupled", "adhered" or "joined" to the structural element or layer directly or indirectly.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

A term "device" used herein may refer to a display device including a display panel and a driver for driving the display panel. Examples of the display device may include an organic light emitting diode (OLED), and the like. In addition, examples of the device may include a notebook computer, a television, a computer monitor, an automotive device, a wearable device, and an automotive equipment device, and a set electronic device (or apparatus) or a set device (or apparatus), for example, a mobile electronic device such as a smartphone or an electronic pad, which are complete products or final products respectively including OLED and the like, but embodiments of the present disclosure are not limited thereto.

A size and a thickness of each component illustrated in the drawing are illustrated for convenience of description, and the present disclosure is not limited to the size and the thickness of the component illustrated.

The same reference numerals may refer to substantially the same elements throughout the present disclosure.

The following embodiments can be partially or entirely bonded to or combined with each other and can be linked and operated in technically various ways. The embodiments can be carried out independently of or in association with each other.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein.

Hereinafter, various embodiments of the present disclosure will be described in detail with reference to the accompanying drawings.

FIG. 1 is a block diagram illustrating a display device according to an exemplary embodiment of the present disclosure. All the components of each display device according to all embodiments of the present disclosure are operatively coupled and configured.

Referring to FIG. 1, a display device according to an exemplary embodiment of the present disclosure includes a display panel 100, a display panel driving circuit for writing pixel data to pixels of the display panel 100, a power supply unit 150, and the like.

[1] The display panel 100 may be a panel with a rectangular-shaped structure having a length in an X-axis direction, a width in a Y-axis direction, and a thickness in a Z-axis direction. A display panel 100 may include a display area AA provided on a substrate (not shown) and non-display areas disposed in the vicinity of (e.g., adjacent to) the display area AA or surrounded in the display area AA. The substrate may include glass, plastic, or a flexible polymer film. For example, the flexible polymer film may be made of any one of polyimide (PI), polyethylene terephthalate (PET), acrylonitrile-butadiene-styrene copolymer (ABS), polymethyl methacrylate (PMMA), polyethylene naphthalate (PEN), polycarbonate (PC), polyethersulfone (PES), polyarylate (PAR), polysulfone (PSF), or ciclic-olefin copolymer, cyclic olefin copolymer (COC), triacetylcellulose (TAC) film, polyvinyl alcohol (PVA) film, and polystyrene (PS), and the present disclosure is not limited thereto.

A display area AA of the display panel 100 includes a pixel array that displays an input image. The pixel array includes a plurality of data lines 102, a plurality of gate lines 103 intersecting the data lines 102, and pixels disposed in a matrix form. The display panel 100 may further include power lines commonly connected to the pixels. The power lines may be commonly connected to pixel circuits and may supply voltages required for driving pixels 101 to the pixels 101.

Each of the pixels 101 may be divided into a red sub-pixel, a green sub-pixel, and a blue sub-pixel for color implementation. Each of the pixels may further include a white sub-pixel. Each of the sub-pixels includes a pixel circuit for driving a light-emitting element. Each of the pixel circuits is connected to the data lines, the gate lines, and the power lines.

The pixels may be disposed as a real color pixel and a pentile pixel. By using a predetermined pentile pixel rendering algorithm, two sub-pixels having different colors may be driven as one pixel 101, so that the pentile pixel allows a resolution higher than that of the real color pixel to be implemented. The pentile pixel rendering algorithm may compensate for the color expression that is insufficient in each of the pixels with the color of light emitted from adjacent pixels.

The pixel array includes a plurality of pixel lines L1 to Ln. Each of the pixel lines L1 to Ln includes one line of pixels disposed in a line direction (the X-axis direction) in the pixel array of the display panel 100. Pixels disposed on one pixel line share the gate lines 103. The sub-pixels arranged in a column direction Y along a data line direction share the same data line 102. One horizontal period is a time obtained by dividing one frame period by the total number of the pixel lines L1 to Ln.

The display panel 100 may be implemented as a non-transmissive display panel or a transmissive display panel. The transmissive display panel may be applied to a transparent display device in which an image is displayed on a screen and an actual object of a background is visible. The display panel 100 may be fabricated as a flexible display panel.

The power supply unit 150 may adjust a level of a DC input voltage applied from a host system 200 and output a first voltage V1 required for driving the pixel array of the display panel 100 and the display panel driving circuit. The power supply unit 150 may include a DC-DC converter. The DC-DC converter may include a charge pump, a regulator, a buck converter, a boost converter, and the like. The power supply unit 150 may output constant voltages (or DC voltages) such as a gate-on voltage VGL, a gate-off voltage VGH, a pixel driving voltage EVDD, a pixel base voltage EVSS, a reference voltage Vref, and an integrated circuit (IC) driving voltage of a pixel driving circuit through the DC-DC converter. The gate-on voltage VGL and the gate-off voltage VGH are supplied to a level shifter 140 and a gate driving unit 120. The voltages such as the pixel driving voltage EVDD, the pixel base voltage EVSS, and the reference voltage Vref are supplied to the pixels 101 through the power lines commonly connected to the pixels 101.

Each of the pixels 101 emits light at a wide viewing angle in a first mode, while emitting light at a viewing angle less than that of the first mode, i.e., a narrow viewing angle, in a second mode.

The display panel driving circuit writes pixel data of an input image to the pixels 101 of the display panel 100 under control of a timing controller 130. The display panel driving circuit includes a data driving unit 110 and the gate driving unit 120. The display panel driving circuit may further include a demultiplexer array 112 disposed between the data driving unit 110 and the data lines 102.

The demultiplexer array 112 sequentially supplies data voltage output from channels of the data driving unit 110 to the data lines 102 by using a plurality of demultiplexers (DEMUXs). Each of the demultiplexers may include a plurality of switch elements disposed on the display panel 100. When the demultiplexers are disposed between output terminals of the data driving unit 110 and the data lines 102, the number of channels of the data driving unit 110 can be reduced. Alternatively, the demultiplexer array 112 may be omitted.

The display panel driving circuit may further include a touch sensor driving unit for driving touch sensors. The touch sensor driving unit is omitted from FIG. 1. Meanwhile, the data driving unit 110 and the touch sensor driving unit may be integrated into one source driver IC.

The data driving unit 110 receives pixel data of an input image, which is received as a digital signal, from the timing controller 130 and outputs a data voltage. Under the control of the timing controller 130, the data driving unit 110 supplies a gamma compensation voltage for each grayscale, which is obtained from a first set of gamma reference voltages in the first mode, to a digital to analog converter (hereinafter referred to as a "DAC") disposed in each channel of the data driving unit 110. Under the control of the timing controller 130, the data driving unit 110 supplies a gamma compensation voltage for each grayscale, which is obtained from a second set of gamma reference voltages in the second mode, to the DACs.

The data driving unit 110 samples and latches the pixel data received from the timing controller 130 and then inputs the pixel data to the DAC disposed for each channel. In the first mode, the DAC converts the pixel data into the gamma compensation voltage for each grayscale obtained from the first set of gamma reference voltages and outputs the data voltage. In the second mode, the DAC converts the pixel data into the gamma compensation voltage for each gray-scale obtained from the second set of gamma reference voltages and outputs the data voltage.

The data driving unit 110 may be integrated into the source driver IC. The data lines 102 of the display panel 100 may be driven by one or more source driver ICs.

Each of the channels of the data driving unit 110 is driven in the first mode or the second mode under the control of the timing controller 130 to output the data voltage of the pixel data.

The gate driving unit 120 may be formed on the display panel 100 together with a thin-film transistor (TFT) array and wirings of the pixel array. The gate driving unit 120 is disposed on at least one of left and right non-display areas BZ outside the display area AA on the display panel 100, or may be disposed at least partially in the display area AA.

The gate driving unit 120 may be disposed in the non-display areas BZ on both sides of the display panel 100 with the display area AA of the display panel interposed therebetween and may supply gate pulses by a double feeding method from both sides of the gate lines 103. In another embodiment, the gate driving unit 120 may be disposed on at least one side of the left and right non-display areas BZ of the display panel 100 and may supply the gate signals to the gate lines 103 by a single feeding method. The gate driving unit 120 sequentially outputs pulses of the gate signals to the gate lines 103 under the control of the timing controller 130. The gate driving unit 120 may sequentially supply the signals to the gate lines 103 by shifting the pulses of the gate signals using shift registers. The gate driving unit 120 may include a plurality of shift registers for outputting the pulses of the gate signals.

In the case of a pixel circuit shown in FIG. 2, the gate driving unit 120 may include a first shift register configured to sequentially output a first gate signal SCAN1, a second shift register configured to sequentially output a second gate signal SCAN2, and a third shift register configured to sequentially output a third gate signal EM.

The timing controller 130 receives digital video data of an input image and timing signals synchronized with the data from the host system 200. The timing signals may include a vertical synchronization signal Vsync, a horizontal synchronization signal Hsync, a data enable signal DE, and the like. The vertical synchronization signal Vsync and the horizontal synchronization signal Hsync may be omitted since a vertical period and a horizontal period may be obtained by a method of counting the data enable signal DE. Each of the horizontal synchronization signal Hsync and the data enable signal DE has a period of one horizontal period 1H.

Based on the timing signals Vsync, Hsync, and DE received from the host system 200, the timing controller 130 generates a data timing control signal for controlling an operation timing of the data driving unit 110, a MUX control signal for controlling an operation timing of the demultiplexer array 112, and a gate timing control signal for controlling an operation timing of the gate driving unit 120. The timing controller 130 controls an operation timing of the display panel driving circuit to synchronize the data driving unit 110, the demultiplexer array 112, and the gate driving unit 120.

The MUX control signal and gate timing control signal output from the timing controller 130 may be input to the demultiplexer array 112 and the shift register of the gate driving unit 120 through the level shifter 140. The level shifter 140 may convert a voltage of the MUX control signal received from the timing controller 130 into a voltage having a swing width between a gate-on voltage and a gate-off voltage and supply the converted voltage to the demultiplexer array 112. The level shifter 140 receives the gate timing control signal, generates a start pulse and a shift clock that swing between the gate-on voltage and the gate-off voltage, and provides the start pulse and the shift clock to the gate driving unit 120.

The gate driving unit 120 may be implemented in a Gate In Panel (GIP) type and directly disposed on the substrate. Alternatively, the gate driving unit 120 can be integrated and arranged on the display panel 100, or each gate driving unit 120 can be implemented by a chip-on-film COF method in which an element is mounted on a film connected to the display panel 100.

The host system 200 may include a main board of any one of a television (TV) system, a set-top box, a navigation system, a personal computer (PC), a vehicle system, a mobile terminal, and a wearable terminal. The host system 200 may scale an image signal from a video source according to the resolution of the display panel 100 and transmit the image signal to the timing controller 130 together with the timing signal. In addition, the host system 200 may transmit, along with the video signal, mode signals having different logical values in the first mode and the second mode to the timing controller 130 one or more times in every frame. The timing controller 130 may generate a selection signal EN in response to the mode signal.

FIG. 2 is a circuit diagram illustrating a pixel circuit according to a first embodiment of the present disclosure. A pixel circuit illustrated in FIG. 2 illustrates an arbitrary sub-pixel circuit disposed in an Nth pixel line (where N is a natural number). The pixel circuit includes an internal compensation circuit that senses a threshold voltage Vth of a driving element DT and compensates for a data voltage Vdata by the threshold voltage Vth of the driving element DT. The pixel circuit of the present disclosure is not limited to that in FIG. 2. FIG. 3 is a view illustrating lenses disposed on first and second light-emitting elements shown in FIG. 2.

Referring to FIGS. 2 and 3, the pixel circuit includes a first light-emitting element EL1 configured to emit light in a first mode S Mode, a second light-emitting element EL2 configured to emit light in a second mode P Mode, the driving element DT configured to drive the first and second light-emitting elements EL1 and EL2, a plurality of switch elements T1 to T7, and a capacitor Cst. The driving element DT and the switch elements T1 to T7 may be implemented as p-channel transistors, but the present disclosure is not limited thereto. For example, the driving element DT and the switch elements T1 to T7 may also be implemented as n-channel transistors.

The pixel circuit is connected to a data line DL through which the data voltage Vdata is applied, and gate lines GL1 to GL5 through which gate signals SCAN1, SCAN2, EM, EN_Sel1, and EN_Sel2 are applied.

The pixel circuit is connected to power nodes, to which DC voltages (or constant voltages) are applied, such as a first constant voltage node PL1 to which a pixel driving voltage EVDD is applied, a second constant voltage node PL2 to which a pixel base voltage EVSS is applied, and a third constant voltage node PL3 to which a reference voltage Vref is applied. Power lines to which the constant voltage nodes are connected may be commonly connected to all the pixels on the display panel 100.

The pixel driving voltage EVDD is set to a voltage higher than the maximum voltage of the data voltage Vdata and allows the driving element DT to operate in a saturation region. The pixel driving voltage EVDD is a voltage higher than the pixel base voltage EVSS. The reference voltage Vref may be set to a voltage that is lower than the pixel driving voltage EVDD and higher than the pixel base voltage EVSS. A gate-off voltage VGH may be set to a voltage higher than the pixel driving voltage EVDD and a gate-on voltage VGL may be set to a voltage lower than the pixel base voltage EVSS. For example, EVDD=13[V], EVSS=0[V], Vref=2.5[V], VGH=14[V], and VGL=−9[V], but the present disclosure is not limited thereto.

The gate signals SCAN1, SCAN2, EM, EN_Sel1, and EN_Sel2 include a pulse that swings between the gate-on voltage VGL and the gate-off voltage VGH.

The driving element DT drives the first and second light-emitting elements EL1 and EL2 by generating a current according to a gate-source voltage Vgs. The driving element DT includes a first electrode connected to the first constant voltage node PL1 to which the pixel driving voltage EVDD is applied, a gate electrode connected to a second node n2, and a second electrode connected to a third node n3.

The first and second light-emitting elements EL1 and EL2 may be implemented as organic light-emitting diodes (OLEDs). Each of the light-emitting elements EL1 and EL2 includes an anode, a cathode, and an organic compound layer formed between the anode and the cathode. The anode of the first light-emitting element EL1 is connected to a second electrode of a sixth switch element T6, and the cathode thereof is connected to the second constant voltage node PL2 to which the pixel base voltage EVSS is applied. The anode of the second light-emitting element EL2 is connected to a second electrode of a seventh switch element T7, and the cathode thereof is connected to the second constant voltage node PL2. The organic compound layer may include a hole injection layer HIL, a hole transport layer HTL, an emission layer EML, an electron transport layer ETL, and an electron injection layer EIL, but the present disclosure is not limited thereto. Each of the light-emitting elements EL1 and EL2 may be implemented in a tandem structure in which a plurality of light-emitting layers are stacked. The light-emitting elements EL1 and EL2 of the tandem structure may improve the luminance and lifetime of the pixel.

The capacitor Cst is connected between a first node n1 and the second node n2. In a sensing period SEN, the data voltage Vdata compensated by the threshold voltage Vth of the driving element DT is stored in the capacitor Cst. The capacitor Cst maintains the gate-source voltage Vgs of the driving element DT during a light-emitting period EMIS.

A first switch element T1 is connected between the data line DL and the first node n1. The first switch element T1 is turned on according to a gate-on voltage VGL of a first gate signal SCAN1 to apply the data voltage Vdata of pixel data to the capacitor Cst. The first switch element T1 includes a first electrode connected to the data line DL, a gate electrode connected to a first gate line GL1 through which the first gate signal SCAN1 is applied, and a second electrode connected to the first node n1.

A second switch element T2 is connected between the second node n2 and the third node n3. The second switch element T2 is turned on according to a gate-on voltage VGL of a second gate signal SCAN2 to connect the gate electrode and second electrode of the driving element DT. The second switch element T2 includes a first electrode connected to the second node n2, a gate electrode connected to a second gate line GL2 through which the second gate signal SCAN2 is applied, and a second electrode connected to the third node n3.

A third switch element T3 is connected between the fourth node n4 and the third constant voltage node PL3. The third switch element T3 is turned on according to the gate-on voltage VGL of the second gate signal SCAN2 to connect the fourth node n4 to the third constant voltage node PL3 to which the reference voltage Vref is applied. The third switch element T3 includes a first electrode connected to the third constant voltage node PL3, a gate electrode connected to the second gate line GL2, and a second electrode connected to the fourth node n4.

A fourth switch element T4 is connected between the first node n1 and the third constant voltage node PL3. The fourth switch element T4 is turned on according to a gate-on voltage VGL of a third gate signal EM to connect the first node n1 to the third constant voltage node PL3. The fourth switch element T4 includes a first electrode connected to the first node n1, a gate electrode connected to a third gate line GL3 through which the third gate signal EM1 is applied, and a second electrode connected to the third constant voltage node PL3.

A fifth switch element T5 is connected between the third node n3 and the fourth node n4. The fifth switch element T5 is turned on according to the gate-on voltage VGL of the third gate signal EM to connect the third node n3 to the fourth node n4. The fifth switch element T5 includes a first electrode connected to the third node n3, a gate electrode connected to a third gate line GL3 through which the third gate signal EM is applied, and a second electrode connected to the fourth node n4.

A sixth switch element T6 is connected between the fourth node n4 and the first light-emitting element EL1. The sixth switch element T6 is turned on according to a gate-on voltage VGL of a first control signal EN_Sel1 to connect the fourth node n4 to the anode of the first light-emitting element EL1. The sixth switch element T6 includes a first electrode connected to the fourth node n4, a gate electrode connected to the fourth gate line GL4 through which the first control signal EN_Sel1 is applied, and a second electrode connected to the anode of the first light-emitting element EL1.

A seventh switch element T7 is connected between the fourth node n4 and the second light-emitting element EL2. The seventh switch element T7 is turned on according to a gate-on voltage VGL of a second control signal EN_Sel2 to connect the fourth node n4 to the anode of the second light-emitting element EL2. The seventh switch element T7 includes a first electrode connected to the fourth node n4, a gate electrode connected to the fifth gate line GL5 through which the second control signal EN_Sel2 is applied, and a second electrode connected to the anode of the second light-emitting element EL2.

As illustrated in FIG. 3, a first lens LENS1 shown in FIG. 3 may be disposed on the first light-emitting element EL1. The first lens LENS1 may be a semi-cylindrical lens in order to limit a vertical viewing angle and widen a horizontal viewing angle. The first lens LENS1 is long in a horizontal direction (or the X-axis direction) of the display panel 100 and narrow in a vertical direction (or the Y-axis direction) thereof. The first lens LENS1 may have a semicircular cross section. The first lens condenses light traveling in the vertical direction among light of the first light-emitting element EL1 emitted in the first mode to narrow the vertical viewing angle and widen the horizontal viewing angle. By the first lens LENS1, the vertical viewing angle of the first light-emitting element EL1 is comparable to that of the second light-emitting element EL2, and the horizontal viewing angle thereof is larger than that of the second light-emitting element EL2. In FIG. 3, "R" indicates a red sub-pixel that emits light, "G" indicates a green sub-pixel that emits light, and "B" indicates a blue sub-pixel that emits light. The sub-pixels darkly expressed in FIG. 3 are non-driving sub-pixels that do not emit light.

Light emitted from a screen of a vehicle display disposed on a dashboard of a vehicle may travel to a front-facing camera disposed in front of an upper end of a room in the vehicle, and the screen of the vehicle display may be seen in an image captured by the front-facing camera. The first lens LENS1 limits the vertical viewing angle of the first light-emitting element EL1 that emits light in the first mode to prevent a ghost image of the screen of the vehicle display, which is captured by the front-facing camera.

A second lens LENS2 shown in FIG. 3 may be disposed on the second light-emitting element EL2. The second lens LENS2 may be a semi-spherical lens whose thickness is larger at the center and smaller toward an edge thereof. The second lens LENS2 may condense light of the second light-emitting element EL2 emitted in the second mode to narrow a vertical viewing angle and a horizontal viewing angle of the second light-emitting element EL2.

The first and second lenses LENS1 and Lens2 may be implemented as transparent media or transparent insulating layer patterns disposed in the display panel 100, for example, each of the first and second lenses LENS1 and Lens2 may be made of transparent insulating material, for example, Polyethylene terephthalate (PET), Polyethylene naphthalate (PEN), polymethyl methacrylate (PMMA), Cyclo-olefin polymers (COP), cyclo-olefin copolymers (COC) and the like, but the present disclosure is not limited thereto.

As shown in FIG. 4, the pixel circuit is driven in the order of an initialization period INI, the sensing period SEN, and the light-emitting period EMIS. The initialization period INI, the sensing period SEN, and the light-emitting period EMIS may be determined by waveforms of the gate signals SCAN1, SCAN2, and EM.

FIG. 4 is a waveform diagram illustrating gate signals and mode selection signals applied to the pixel circuit shown in FIG. 2. The gate signals generated in the first mode S Mode and the gate signals generated in the second mode P Mode are shown.

The first, second, and third gate signals SCAN1, SCAN2, and EM are common gate signals generated at the same timing in the first and second modes S Mode and P Mode.

During the initialization period INI of the first mode S Mode, the voltage of each of the second and third gate signals SCAN2 and EM and a first mode selection signal EN_Sel1 is the gate-on voltage VGL. During the initialization period INI of the first mode S Mode, the voltage of each of the first gate signal SCAN1 and a second mode selection signal EN_Sel2 is the gate-off voltage VGH. Accordingly, during the initialization period INI of the first mode S Mode, the second to sixth switch elements T2 to T6 are turned on, while the first and seventh switch elements T1 and T7 are turned off. At this time, the voltage of each of the first, third, and fourth nodes n1, n3, and n4 is initialized to the reference voltage Vref, and the gate-source voltage Vgs of the capacitor Cst and the driving element DT and an anode voltage of each of the light-emitting elements EL1 and EL2 are initialized.

During the initialization period INI of the second mode P Mode, the voltage of each of the second and third gate signals SCAN2 and EM and the second mode selection signal EN_Sel2 is the gate-on voltage VGL. During the initialization period INI of the second mode P Mode, the voltage of each of the first gate signal SCAN1 and the first mode selection signal EN_Sel1 is the gate-off voltage VGH. Accordingly, during the initialization period INI of the second mode P Mode, the second to fifth and seventh switch elements T2 to T5 and T7 are turned on, while the first and sixth switch elements T1 and T6 are turned off. At this time, the voltage of each of the first, third, and fourth nodes n1, n3, and n4 is initialized to the reference voltage Vref, and the gate-source voltage Vgs of the capacitor Cst and the driving element DT and the anode voltage of each of the light-emitting elements EL1 and EL2 are initialized.

In the first and second modes S Mode and P Mode, the pulse of the first gate signal SCAN1 synchronized with the data voltage Vdata of the pixel data is input to the pixel circuit during the sensing period SEN. The voltage of the pulse of the first gate signal SCAN1 is the gate-on voltage VGL for one horizontal period 1H. During the sensing period SEN, the voltage of the second gate signal SCAN2 is the gate-on voltage VGL, and the voltage of each of the third gate signals EM is the gate-off voltage VGH. Accordingly, during the sensing period SEN of the first mode S Mode, the first, second, third, and sixth switch elements T1, T2, T3, and T6 are turned on, while the fourth, fifth, and seventh switch elements T4, T5, and T7 are turned off.

During the sensing period SEN, the data voltage Vdata is applied to the first node n1, and the driving element DT is turned on so that the voltage of the third node n3 is increased. During the sensing period SEN, when the gate voltage of the driving element DT rises and the gate-source voltage Vgs reaches the threshold voltage Vth of the driving element DT, the driving element DT is turned off. At this time, "Vdata−EVDD+Vth" is stored in the capacitor Cst. Here, "Vth" is the threshold voltage Vth of the driving element DT.

During the light-emitting period EMIS of the first mode S Mode, the voltage of each of the third gate signal EM and the first mode selection signal EN_Sel1 is the gate-on voltage VGL, and the voltage of each of the first and second gate signals SCAN1 and SCAN2 and the second mode selection signal EN_Sel2 is the gate-off voltage VGH. Accordingly, during the light-emitting period EMIS of the first mode S Mode, the fourth to sixth switch elements T4 to T6, along with the driving element DT, are turned on, while the first to third switch elements T1, T2, and T3 and the seventh switch element T7 are turned off.

During the light-emitting period EMIS of the first mode S Mode, the driving element DT supplies the current generated according to the gate-source voltage Vgs to the first light-emitting element EL1. During the light-emitting period EMIS of the first mode S Mode, the first light-emitting element EL1 emits light at a brightness corresponding to a grayscale value of the pixel data, and the light passes through the first lens LENS1 and is emitted at a large angle in the horizontal direction.

During the light-emitting period EMIS of the second mode P Mode, the voltage of each of the third gate signal EM and the second mode selection signal EN_Sel2 is the gate-on voltage VGL, and the voltage of each of the first and second gate signals SCAN1 and SCAN2 and the first mode selection signal EN_Sel1 is the gate-off voltage VGH. Accordingly, during the light-emitting period EMIS of the second mode P Mode, the fourth, fifth, and seventh switch elements T4, T5, and T7, along with the driving element DT, are turned on, while the first to third switch elements T1, T2, and T3 and the sixth switch element T6 are turned off.

During the light-emitting period EMIS of the second mode P Mode, the driving element DT supplies the current generated according to the gate-source voltage Vgs to the second light-emitting element EL2. The second light-emitting element EL2 emits light at a brightness corresponding to a grayscale value of the pixel data during the light-emitting period EMIS of the second mode P Mode, and the light is condensed by the second lens LENS2 at a small angle in the vertical direction and the horizontal direction.

FIGS. 5 to 10 are diagrams for describing a mode switching principle according to an exemplary embodiment, and FIG. 11 is a circuit diagram illustrating an actual implementation circuit of a shift register and an output circuit shown in FIG. 8.

Referring to FIG. 5, a source driver IC D-IC is connected between a printed circuit board PCB and a display panel 100.

A timing controller (TCON) 130 may be mounted on the printed circuit board PCB.

Level shifter 140 may be mounted on the printed circuit board PCB. Input terminals of the level shifters 140L and 140R are connected to the timing controller 130 through wirings. Output terminals of the level shifters 140L and 140R may be connected to a gate driving unit 120 through wirings connecting the printed circuit board PCB and the gate driving unit 120 on the display panel 100.

The gate driving unit 120 is connected to gate lines of first and second display areas A1 and A2 to supply gate signals to pixel circuits disposed in the first and second display areas A1 and A2.

A shift register OC1 may output a mode control signal for driving the pixel circuit sharing a data line on a line basis according to clock signals CLK1 and CLK2.

An output circuit OC2 may output the mode control signal output from the shift register OC1 according to a line control signal LCLK.

A multiplexing switch unit MUX may output a gate-on voltage VGL and a gate-off voltage VGH to the pixel circuit of the corresponding line on the basis of the mode control signal output from the output circuit OC2.

In the pixel circuits disposed in the first display area A1, a first light-emitting element emits light, and in the pixel circuits disposed in the second display area A2, a second light-emitting element emits light.

At this time, the pixel circuits disposed in the first display area A1 and the pixel circuits disposed in the second display area A2 may be driven in different modes or may be driven in the same mode. The first display area A1 and the second display area A2 may be changed on a data line basis.

Referring to FIGS. 6, 7A, and 7B, a multiplexing switch unit MUX according to an exemplary embodiment of the present disclosure may output a mode selection signal to pixel circuits sharing a data line on a line basis according to a mode control signal.

As shown in FIG. 7A, the multiplexing switch unit MUX may include a plurality of multiplexing switches TR1*a*, TR1*b*, TR2*a*, and TR2*b* implemented as p-channel transistors.

A 1ath multiplexing switch TR1*a* and a 1bth multiplexing switch TR1*b* are connected in parallel to a first line L1 connected to a gate electrode of a sixth switch element, and an inverter is connected to a gate electrode of the 1ath multiplexing switch TR1*a*. Thus, the 1ath multiplexing switch TR1*a* is turned on by a high voltage level of the mode control signal and applies a gate-on voltage VGL to the gate electrode of the sixth switch element to turn on the sixth switch element so that a first light-emitting element EL1 emits light.

The 1bth multiplexing switch TR1*b* is turned off by the high voltage level of the mode control signal.

A 2ath multiplexing switch TR2*a* and a 2bth multiplexing switch TR2*b* are connected in parallel to a second line L2 connected to a gate electrode of a seventh switch element, and an inverter is connected to a gate electrode of the 2ath multiplexing switch TR2*a*. Thus, the 2ath multiplexing switch TR2*a* is turned on by the high voltage level of the mode control signal and applies a gate-off voltage VGH to the gate electrode of the seventh switch element to turn the seventh switch element off.

The 2bth multiplexing switch TR2*b* is turned off by the high voltage level of the mode control signal.

Here, a case in which the first light-emitting element emits light in a first mode is described, and a case in which the second light-emitting element emits light in a second mode is driven in the same manner.

As shown in FIG. 7B, the multiplexing switch unit MUX may include the plurality of multiplexing switches TR1*a*, TR1*b*, TR2*a*, and TR2*b* implemented as n-channel transistors.

The 1ath multiplexing switch TR1*a* and the 1bth multiplexing switch TR1*b* are connected in parallel to the first line L1 connected to the gate electrode of the sixth switch element. The 1ath multiplexing switch TR1*a* is turned on by the high voltage level of the mode control signal to allow the first light-emitting element EL1 to emit light.

The 1bth multiplexing switch TR1*b* is turned off as an inverter INV is connected to the gate electrode of the 1bth multiplexing switch TR1*b* and the high voltage level of the mode control signal is applied through the inverter INV.

The 2ath multiplexing switch TR2*a* and the 2bth multiplexing switch TR2*b* are connected in parallel to the second line L2 connected to the gate electrode of the seventh switch element. The 2ath multiplexing switch TR2*a* is turned on by the high voltage level of the mode control signal to allow the first light-emitting element EL1 to emit light.

The 2bth multiplexing switch TR2*b* is turned off as the inverter INV is connected to the gate electrode of the 2bth multiplexing switch TR2*b* and the high voltage level of the mode control signal is applied through the inverter INV.

Referring to FIGS. 8 to 10, the mode control signal may be output to the pixel circuits sharing the data line on a line basis through the shift register OC1 and the output circuit OC2 according to the embodiment of the present disclosure. The mode control signal is input to the multiplexing switch unit MUX.

The shift register OC1 may include a plurality of cascade-connected signal transmission units ST(1) to ST(N). The plurality of signal transmission units ST(1) to ST(N) may output values according to a start signal VST on the basis of the clock signals CLK1 and CLK2.

As shown in FIG. 9, the plurality of signal transmission units ST(1) to ST(N) may sequentially output the output values according to a clock signal CLK.

The output circuit OC2 may include a plurality of logic circuits LC(1) to LC(N). The plurality of logic circuits LC(1) to LC(N) may store result values output from the shift register OC1, and may output mode control signals MC(1) to MC(N) according to result values D<1> to D<N> on the basis of a line control signal LCK. The logic circuit may include a latch and a flip-flop.

The shift register OC1 and the output circuit OC2 may be implemented as shown in FIG. 11, but may be implemented with various circuits without necessarily being limited thereto.

Here, an EM start signal EM_VST is input to the gate driving unit for driving the light-emitting elements of the pixel circuits disposed on the corresponding line at a high voltage level of the line control signal LCLK. That is, the light-emitting elements of the pixel circuits disposed in the first display area and the second display area may be driven at a time when the line control signal LCLK is at the high voltage level.

As shown in FIG. 10, the first light-emitting element and the second light-emitting element of each pixel circuit are selectively driven according to the mode control signals MC(1) to MC(N) output from the plurality of logic circuits LC(1) to LC(N), so that the display area displays by being divided into the first display area A1 and the second display area A2.

That is, the pixel circuits disposed in the first display area A1 are operated in the first mode S Mode, and the pixel circuits disposed in the second display area A2 are operated in the second mode P Mode.

FIGS. 12 and 13 are diagrams for describing a mode switching principle according to another embodiment.

As shown in FIGS. 8, 12, and 13, a first light-emitting element and a second light-emitting element of each pixel circuit are selectively driven according to mode control signals MC(1) to MC(N) output from plurality of logic circuits LC(1) to LC(N), so that a display area displays by being divided into a first display area A1, a second display area A2, and a third display area A3.

For example, the second light-emitting element is driven in the first display area, which is an area in which a mode control signal Mode Control is low, the first light-emitting element is driven in the second display area, which is an area in which the mode control signal Mode Control is high, and the second light-emitting element is driven in the third display area, which is an area in which the mode control signal Mode Control is low.

Thus, the pixel circuits disposed in the first display area A1 are operated in a second mode P Mode, the pixel circuits disposed in the second display area A2 are operated in a first mode S Mode, and the pixel circuits disposed in the third display area A3 are operated in the second mode P Mode.

As shown in FIG. 13, a line control signal becomes a high voltage level in a (a−1)th line, and accordingly, an EM start signal EM_VST applied to a gate driving unit becomes a low voltage level.

FIG. 14 is a view illustrating information reproduced on a screen of a display device according to an exemplary embodiment of the present disclosure.

Referring to FIG. 14, in an exemplary embodiment of the present disclosure, a case is illustrated in which a display area may be driven in line basis modes, that is, a first mode being a share mode and a second mode being a privacy mode, so that the display area is variable.

Here, a case in which the display area is divided into six display areas is described as an example, but the present disclosure is not limited thereto.

In the embodiment, the display area is divided into a plurality of display areas by selectively operating the display area on a line basis, and each of the plurality of display areas may be operated in the first mode and the second mode.

The exemplary embodiments of the present disclosure can also be described as follows:

According to an exemplary embodiment of the present disclosure, a display panel is provided, the display panel may comprise: a plurality of pixel circuits each configured to selectively emit light in more than one mode: a shift register configured to output a mode control signal for driving each of the pixel circuits sharing a data line on a line basis according to a clock signal: an output circuit configured to output the mode control signal output from the shift register according to a line control signal: and a multiplexing switch unit configured to output a gate-on voltage and a gate-off voltage to the pixel circuits of a corresponding line on the basis of the mode control signal output from the output circuit.

Furthermore, the display panel may include at least two display areas, pixel circuits disposed in one display area are operable in a first mode, and pixel circuits disposed in other display areas are operable in a second mode different from the first mode.

Furthermore, each of the pixel circuits may include: a first light-emitting element; a second light-emitting element: a driving element configured to generate a driving current of each of the first and second light-emitting elements: a first switch element connected between the driving element and a first node and turned on in response to a gate signal; a second switch element connected between the first node and the first light-emitting element and turned on in response to the gate-on voltage; and a third switch element connected between the first node and the second light-emitting element and turned on in response to the gate-on voltage.

Furthermore, the display panel may further comprise: a first lens disposed on the first light-emitting element: and a second lens disposed on the second light-emitting element.

Furthermore, the first lens may be a semi-cylindrical lens, and the second lens may be a semi-spherical lens.

Furthermore, the multiplexing switch unit may include: a 1ath multiplexing switch configured to apply the gate-on voltage to the second switch element when the mode control signal is at a high voltage level: a 2ath multiplexing switch configured to apply the gate-off voltage to the third switch element when the mode control signal is at the high voltage level; a 1bth multiplexing switch configured to apply the gate-off voltage to the second switch element when the mode control signal is at a low voltage level: and a 2bth multiplexing switch configured to apply the gate-on voltage to the third switch element when the mode control signal is at the low voltage level.

Furthermore, each of the pixel circuits may further include: an inverter connected to the gate electrodes of the 1ath and 2ath multiplexing switches or connected to the gate electrodes of the 1bth and 2bth multiplexing switches.

Furthermore, gate electrodes of the 1ath and 2ath multiplexing switches are connected to each other, gate electrodes of the 1bth and 2bth multiplexing switches are connected to each other, and the mode control signal is applied to the gate electrodes of all of the 1ath multiplexing switch, the 1bth multiplexing switch, the 2ath multiplexing switch, and the 2bth multiplexing switch.

Furthermore, the 1ath and 1bth multiplexing switches and the 2ath and 2bth multiplexing switches are implemented as p-channel transistors, and an inverter is connected to the gate electrodes of the 1ath and 2ath multiplexing switches.

Furthermore, the 1ath and 1bth multiplexing switches and the 2ath and 2bth multiplexing switches are implemented as n-channel transistors, and an inverter is connected to the gate electrodes of the 1bth and 2bth multiplexing switches.

Furthermore, the shift register may include a plurality of cascade-connected signal transmission units, wherein each of the plurality of signal transmission units sequentially outputs an output value corresponding to a voltage level of a start pulse, which is input according to the clock signal, to the output circuit as the mode control signal.

Furthermore, each of the pixel circuits may include: a first light-emitting element driven according to a first mode; and a second light-emitting element driven according to a second mode, and a voltage level of the start pulse is determined according to an area in which the pixel circuits are driven in the first mode or the second mode on a line basis.

Furthermore, the output circuit may include a plurality of logic circuits, wherein the plurality of logic circuits store output values output from the plurality of signal transmission units, respectively, and output the stored output values to the pixel circuits of the corresponding line according to the line control signal.

According to another embodiment of the present disclosure, a display device may comprise: a display panel including a plurality of pixel circuits each configured to selectively emit light in more than one mode, a shift register configured to output a mode control signal for driving each of the pixel circuits sharing a data line on a line basis according to a clock signal, an output circuit configured to output the mode control signal output from the shift register according to a line control signal, and a multiplexing switch unit configured to output a gate-on voltage and a gate-off voltage to the pixel circuits of a corresponding line on the basis of the mode control signal output from the output circuit: a gate driving unit configured to apply a gate signal to the plurality of pixel circuits; and a data driving unit configured to apply a data voltage to the plurality of pixel circuits.

Furthermore, the display panel may include at least two display areas, pixel circuits disposed in one display area are operable in a first mode, and pixel circuits disposed in other display areas are operable in a second mode different from the first mode.

Furthermore, each of the pixel circuits may include: a first light-emitting element; a second light-emitting element: a driving element configured to generate a driving current of each of the first and second light-emitting elements: a first switch element connected between the driving element and a first node and turned on in response to the gate signal: a second switch element connected between the first node and the first light-emitting element and turned on in response to the gate-on voltage: and a third switch element connected between the first node and the second light-emitting element and turned on in response to the gate-on voltage.

Furthermore, the display panel may further include: a first lens disposed on the first light-emitting element: and a second lens disposed on the second light-emitting element.

Furthermore, the first lens is a semi-cylindrical lens, and the second lens is a semi-spherical lens.

Furthermore, the multiplexing switch unit may include: a first-first multiplexing switch configured to apply the gate-on voltage to the second switch element when the mode control signal is at a high voltage level: a second-first multiplexing switch configured to apply the gate-off voltage to the third switch element when the mode control signal is at the high voltage level: a first-second multiplexing switch configured to apply the gate-off voltage to the second switch element when the mode control signal is at a low voltage level; and a second-second multiplexing switch configured to apply the gate-on voltage to the third switch element when the mode control signal is at the low voltage level.

Furthermore, each of the pixel circuits may further include: an inverter connected to the gate electrodes of the 1ath and 2ath multiplexing switches or connected to the gate electrodes of the 1bth and 2bth multiplexing switches.

Furthermore, gate electrodes of the first-first and second-first multiplexing switches are connected to each other, gate electrodes of the first-second and second-second multiplexing switches are connected to each other, and the mode control signal is applied to the gate electrodes of all of the first-first multiplexing switch, the first-second multiplexing switch, the second-first multiplexing switch, and the second-second multiplexing switch.

Furthermore, the first-first and first-second multiplexing switches and the second-first and second-second multiplexing switches are implemented as p-channel transistors, and an inverter is connected to the gate electrodes of the first-first and second-first multiplexing switches.

Furthermore, the first-first and first-second multiplexing switches and the second-first and second-second multiplexing switches are implemented as n-channel transistors, and an inverter is connected to the gate electrodes of the first-second and second-second multiplexing switches.

Furthermore, the shift register may include a plurality of cascade-connected signal transmission units, wherein each of the plurality of signal transmission units sequentially outputs an output value corresponding to a voltage level of a start pulse, which is input according to the clock signal, to the output circuit as the mode control signal.

Furthermore, each of the pixel circuits may include: a first light-emitting element driven according to a first mode: and a second light-emitting element driven according to a second mode, and a voltage level of the start pulse is determined according to an area in which the pixel circuits are driven in the first mode or the second mode on a line basis.

Furthermore, the output circuit may include a plurality of logic circuits, wherein the plurality of logic circuits store output values output from the plurality of signal transmission units, respectively, and output the stored output values to the pixel circuits of the corresponding line according to the line control signal.

It will be apparent to those skilled in the art that various modifications and variations can be made in the display panel and the display device including the same of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display panel, comprising:

a plurality of pixel circuits each configured to selectively emit light in more than one mode;

a shift register configured to output a mode control signal for driving each of the pixel circuits sharing a data line on a line basis according to a clock signal;

an output circuit configured to output the mode control signal output from the shift register according to a line control signal; and a multiplexing switch unit configured to output a gate-on voltage and a gate-off voltage to the pixel circuits of a corresponding line on the basis of the mode control signal output from the output circuit.

2. The display panel of claim 1, wherein the display panel includes at least two display areas, pixel circuits disposed in one display area are operable in a first mode, and pixel circuits disposed in other display areas are operable in a second mode different from the first mode.

3. The display panel of claim 1, wherein each of the pixel circuits includes:

a first light-emitting element;

a second light-emitting element;

a driving element configured to generate a driving current of each of the first and second light-emitting elements;

a first switch element connected between the driving element and a first node and turned on in response to a gate signal;

a second switch element connected between the first node and the first light-emitting element and turned on in response to the gate-on voltage; and a third switch element connected between the first node and the second light-emitting element and turned on in response to the gate-on voltage.

4. The display panel of claim 3, wherein the multiplexing switch unit includes:

a 1ath multiplexing switch configured to apply the gate-on voltage to the second switch element when the mode control signal is at a high voltage level;

a 2ath multiplexing switch configured to apply the gate-off voltage to the third switch element when the mode control signal is at the high voltage level;

a 1bth multiplexing switch configured to apply the gate-off voltage to the second switch element when the mode control signal is at a low voltage level; and a 2bth multiplexing switch configured to apply the gate-on voltage to the third switch element when the mode control signal is at the low voltage level.

5. The display panel of claim 4, wherein each of the pixel circuits further includes:

an inverter connected to the gate electrodes of the 1ath and 2ath multiplexing switches or connected to the gate electrodes of the 1bth and 2bth multiplexing switches.

6. The display panel of claim 4, wherein gate electrodes of the 1ath and 2ath multiplexing switches are connected to each other, gate electrodes of the 1bth and 2bth multiplexing switches are connected to each other, and the mode control signal is applied to the gate electrodes of all of the 1ath multiplexing switch, the 1bth multiplexing switch, the 2ath multiplexing switch, and the 2bth multiplexing switch.

7. The display panel of claim 6, wherein the 1ath and 1bth multiplexing switches and the 2ath and 2bth multiplexing switches are implemented as p-channel transistors, and an inverter is connected to the gate electrodes of the 1ath and 2ath multiplexing switches.

8. The display panel of claim 6, wherein the 1ath and 1bth multiplexing switches and the 2ath and 2bth multiplexing switches are implemented as n-channel transistors, and an inverter is connected to the gate electrodes of the 1bth and 2bth multiplexing switches.

9. The display panel of claim 1, wherein the shift register includes a plurality of cascade-connected signal transmission units, wherein each of the plurality of signal transmission units sequentially outputs an output value corresponding to a voltage level of a start pulse, which is input according to the clock signal, to the output circuit as the mode control signal.

10. The display panel of claim 9, wherein each of the pixel circuits includes:

a first light-emitting element driven according to a first mode; and a second light-emitting element driven according to a second mode, and a voltage level of the start pulse is determined according to an area in which the pixel circuits are driven in the first mode or the second mode on a line basis.

11. The display panel of claim 9, wherein the output circuit includes a plurality of logic circuits, wherein the plurality of logic circuits store output values output from the plurality of signal transmission units, respectively, and output the stored output values to the pixel circuits of the corresponding line according to the line control signal.

12. A display device, comprising:

a display panel including a plurality of pixel circuits each configured to selectively emit light in more than one mode, a shift register configured to output a mode control signal for driving each of the pixel circuits sharing a data line on a line basis according to a clock signal, an output circuit configured to output the mode control signal output from the shift register according to a line control signal, and a multiplexing switch unit configured to output a gate-on voltage and a gate-off voltage to the pixel circuits of a corresponding line on the basis of the mode control signal output from the output circuit;

a gate driving unit configured to apply a gate signal to the plurality of pixel circuits; and a data driving unit configured to apply a data voltage to the plurality of pixel circuits.

13. The display panel of claim 12, wherein the display panel includes at least two display areas, pixel circuits disposed in one display area are operable in a first mode, and pixel circuits disposed in other display areas are operable in a second mode different from the first mode.

14. The display device of claim 13, wherein each of the pixel circuits includes:

a first light-emitting element;

a second light-emitting element;

a driving element configured to generate a driving current of each of the first and second light-emitting elements;

a first switch element connected between the driving element and a first node and turned on in response to the gate signal;

a second switch element connected between the first node and the first light-emitting element and turned on in response to the gate-on voltage; and a third switch element connected between the first node and the second light-emitting element and turned on in response to the gate-on voltage.

15. The display device of claim 14, wherein the multiplexing switch unit includes:

a first-first multiplexing switch configured to apply the gate-on voltage to the second switch element when the mode control signal is at a high voltage level;

a second-first multiplexing switch configured to apply the gate-off voltage to the third switch element when the mode control signal is at the high voltage level;

a first-second multiplexing switch configured to apply the gate-off voltage to the second switch element when the mode control signal is at a low voltage level; and a second-second multiplexing switch configured to apply the gate-on voltage to the third switch element when the mode control signal is at the low voltage level.

16. The display device of claim 15, wherein each of the pixel circuits further includes:

an inverter connected to the gate electrodes of the 1ath and 2ath multiplexing switches or connected to the gate electrodes of the 1bth and 2bth multiplexing switches.

17. The display device of claim 15, wherein gate electrodes of the first-first and second-first multiplexing switches are connected to each other, gate electrodes of the first-second and second-second multiplexing switches are connected to each other, and the mode control signal is applied to the gate electrodes of all of the first-first multiplexing switch, the first-second multiplexing switch, the second-first multiplexing switch, and the second-second multiplexing switch.

18. The display device of claim 17, wherein the first-first and first-second multiplexing switches and the second-first and second-second multiplexing switches are implemented as p-channel transistors, and an inverter is connected to the gate electrodes of the first-first and second-first multiplexing switches.

19. The display device of claim 17, wherein the first-first and first-second multiplexing switches and the second-first and second-second multiplexing switches are implemented as n-channel transistors, and an inverter is connected to the gate electrodes of the first-second and second-second multiplexing switches.

20. The display device of claim 12, wherein the shift register includes a plurality of cascade-connected signal transmission units, wherein each of the plurality of signal transmission units sequentially outputs an output value corresponding to a voltage level of a start pulse, which is input according to the clock signal, to the output circuit as the mode control signal.

21. The display device of claim 20, wherein each of the pixel circuits includes:

a first light-emitting element driven according to a first mode; and a second light-emitting element driven according to a second mode, and a voltage level of the start pulse is determined according to an area in which the pixel circuits are driven in the first mode or the second mode on a line basis.

22. The display device of claim 20, wherein the output circuit includes a plurality of logic circuits, wherein the plurality of logic circuits store output values output from the plurality of signal transmission units, respectively, and output the stored output values to the pixel circuits of the corresponding line according to the line control signal.

* * * * *